United States Patent [19]

Kosik et al.

[11] Patent Number: 5,759,131
[45] Date of Patent: Jun. 2, 1998

[54] CONTROL OF AN AUTOMATIC CLUTCH

[75] Inventors: Franz Kosik, Ostfildern; Günter Wörner, Kernen, both of Germany

[73] Assignee: Mercedes-Benz AG, Stuttgart, Germany

[21] Appl. No.: 680,410

[22] Filed: Jul. 15, 1996

[30] Foreign Application Priority Data

Aug. 21, 1995 [DE] Germany ............. 195 30 613.9

[51] Int. Cl.[6] .................................. F16D 48/02
[52] U.S. Cl. .................................. 477/84; 477/86
[58] Field of Search ............... 477/70, 83, 84, 477/86, 169, 174, 175, 176

[56] References Cited

U.S. PATENT DOCUMENTS

| | | | |
|---|---|---|---|
| 4,632,231 | 12/1986 | Hattori et al. | 477/175 |
| 4,644,826 | 2/1987 | Kubo et al. | 477/95 |
| 4,653,621 | 3/1987 | Oshiage . | |
| 4,730,708 | 3/1988 | Hamano et al. | 477/114 |
| 4,735,113 | 4/1988 | Yamamuro et al. | 477/62 X |
| 5,002,170 | 3/1991 | Parsons et al. | 477/86 |
| 5,024,305 | 6/1991 | Kurihara et al. | 477/175 |
| 5,072,815 | 12/1991 | Jarvis | 477/83 X |
| 5,097,724 | 3/1992 | Braun | 477/73 |
| 5,152,388 | 10/1992 | Soda et al. | 477/77 |
| 5,179,867 | 1/1993 | Sakakibara et al. | 74/335 |
| 5,626,535 | 5/1997 | Kono et al. | 477/174 X |
| 5,636,120 | 6/1997 | Yesel et al. | 74/335 X |

FOREIGN PATENT DOCUMENTS

| | | |
|---|---|---|
| 0 393 910 | 10/1990 | European Pat. Off. . |
| 0 536 932 | 4/1993 | European Pat. Off. . |
| 0 601 728 | 6/1994 | European Pat. Off. . |
| 35 16 245 | 11/1985 | Germany . |
| 37 37 619 | 5/1988 | Germany . |
| 3 939 615 | 5/1990 | Germany . |
| 44 26 260 | 2/1995 | Germany . |
| 2 158 912 | 11/1985 | United Kingdom . |

OTHER PUBLICATIONS

Auto Week (Aug. 18, 1997): Shifting Fortunes (pp. 17–19).

Primary Examiner—Khoi Q. Ta
Assistant Examiner—Peter T. Kwon
Attorney, Agent, or Firm—Klaus T. Bach

[57] ABSTRACT

In a control for an automatic clutch disposed between the engine and the drive train of a vehicle for controlling the vehicle movement at start or during transitional phases, the clutch is controlled in such a way that, with a predetermined low engine speed, movement of the vehicle at a predetermined creeping speed is obtained.

4 Claims, 1 Drawing Sheet

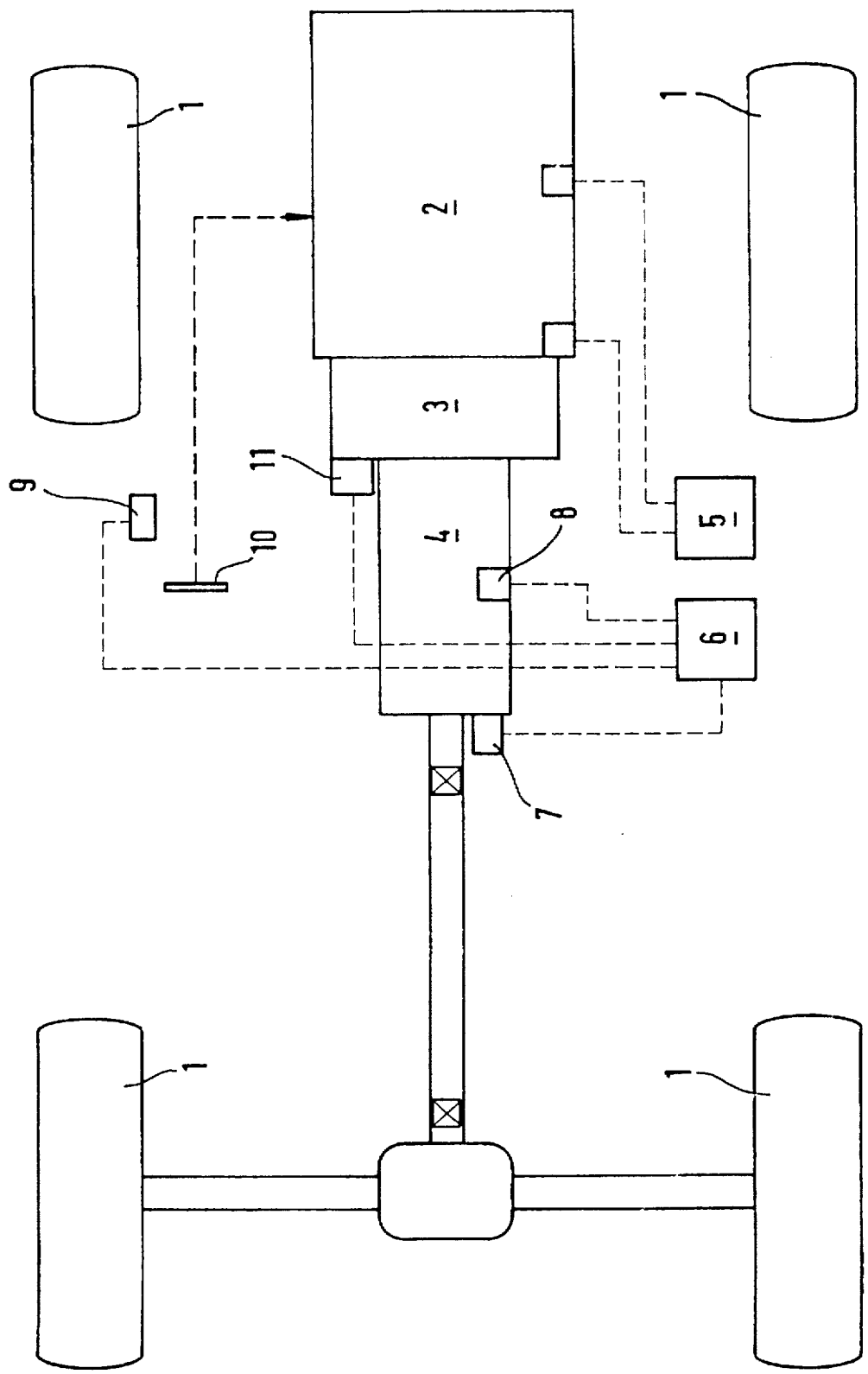

5,759,131

1
CONTROL OF AN AUTOMATIC CLUTCH
BACKGROUND OF THE INVENTION

The invention relates to the control of an automatic clutch arranged between an engine, especially an internal combustion engine, and the drive train of a vehicle during creeping periods for example during starting or during transient operating speeds changing between very slow speeds and stops.

Vehicles with manual transmission and with automatically operated clutches are generally known and have been in use for some time. In those vehicles, the automatic clutch becomes activated during starts or during transitional operating phases between low speeds and stops, that is during creeping periods wherein the slip of the clutch is automatically controlled so as to facilitate a jerk-free start up or acceleration after starting and also a jerk-free stopping of the vehicle.

Reference is made in this connection to DE 44 26 260 A1 wherein an automatic clutch is disclosed which, during creeping periods, is moved steadily toward an engaged position if neither brake nor accelerating pedals are operated.

It has also been tried already, to control the coupling torque that is the torque that can be transmitted by the clutch by way of an automatically actuated control member of the clutch.

Both solutions are usable in principle. But with such arrangements the vehicle behavior is somewhat different from vehicle to vehicle because of unavoidable manufacturing tolerances especially differently acting clutch engagement springs.

Furthermore, the behavior during creeping periods depends also on other parameters. Different temperatures for example, may result in different creeping behavior of a vehicle even if the clutch operating movement of the controller remains the same.

It is therefor the object of the present invention to provide a new control principle for operating an automatic clutch whose behavior is essentially the same in any vehicle.

SUMMARY OF THE INVENTION

In a control for an automatic clutch disposed between the engine and the drive train of a vehicle for controlling the vehicle movement at start or during transitional phases, the clutch is controlled in such a way that, with a predetermined low engine speed, movement of the vehicle at a predetermined creeping speed is obtained.

The invention is based on the general idea to control the clutch during the creeping phase on the basis of a speed control for the vehicle so as to obtain a vehicle behavior which remains the same even if the operating conditions vary. The invention advantageously utilizes the fact that today's vehicles engines are always equipped with an engine control unit which counteracts a drop in engine speed below a desired minimum engine speed, generally the desired engine idle speed, wherein the engine minimum speed remains unchanged without driver action even if the engine load increases.

In this manner, a uniform creeping behavior of the vehicle can be achieved be it on level or inclined surfaces.

Preferred embodiments of the invention are described below in detail on the basis of the enclosed FIGURE.

BRIEF DESCRIPTION OF THE DRAWINGS

The sole FIGURE is a schematic representation of a vehicle with an automatic clutch which is controlled in accordance with the invention and with a manually operated transmission.

2
DESCRIPTION OF PREFERRED EMBODIMENTS

Of the vehicle only the wheels 1, the engine 2, the clutch 3 and the transmission 4 are shown in the FIGURE wherein the rear wheels 1 are driven by the engine 2 by way of the automatic clutch 3 and the manually operated transmission 4.

The engine 2 is provided with an automatic engine control 5 which is well known in the art and which controls the engine in such a way that the desired engine operating speed (rpm) will not normally fall below a desired minimum speed generally the idle speed, even if the engine load increases.

The clutch 3 is provided with a control circuit 6 which is shown separately but which may be combined with the engine control 5 into a single control unit.

At the input side, the control circuit 6 (or the control unit) is connected to a sensor 7 for sensing the vehicle speed, for example, the speedometer of the vehicle. However, the control circuit 6 (or the control unit) may have inputs from additional sensors such as a sensor 8 whose signal indicates at which transmission ratio the transmission 4 is operated that is which gear has been selected by the driver.

Another sensor 9 connected to the input side of the control circuit 6 (or the control unit) may be a sensor indicating the position of the driver-operated gas pedal 10 for controlling engine output.

The output of the control circuit 6 (or the control unit) is connected to a preferably electrical servomotor 11 which operates the clutch 3 such that, dependent on the operating position of the servomotor 11, the clutch 3 is either fully disengaged, fully engaged or in an in-between position adjusted for the transmission of various torques.

As soon as the control circuit 6 (or the control unit) learns from the signals of the sensors 7 to 9 that the transmission has been placed into a gear suitable for starting, generally, first gear or reverse, and the driver does not actuate the gas pedal 10 while the vehicle speed is below a small threshold value, the servomotor 11 is so operated that a predetermined small vehicle speed below the threshold value is obtained.

Preferably, the clutch is controlled to operate the vehicle at this predetermined small speed (creeping speed) only if the transmission is in first gear or in reverse and the driver operated gas pedal is not operated and further if the vehicle speed is below a predetermined threshold value.

At an engine speed above idle speed, the clutch is engaged or the clutch is so controlled as to maintain a certain vehicle speed greater than creeping speed.

It is advantageous if, during operation of the vehicle at creeping speeds, the torque transmitted by the clutch remains below a predetermined threshold value. Of course, as it is generally done today, the engine should be controlled so as to maintain a speed above a certain threshold value.

In this manner, a uniform vehicle creeping behavior is obtained under any operating condition, which is, particularly, independent of whether the vehicle is moving on a level or on an incline.

What is claimed is:

1. A control system for an automatic mechanical clutch disposed between an engine having an engine controller for controlling said engine so as to maintain a predetermined minimum speed, and a drive train including a manual shift transmission of a vehicle for controlling the vehicle during creeping periods at predetermined creeping speeds, said system including a sensor indicating whether said transmission is in a given gear (first gear or reverse), another sensor indicating the position of a driver-operated control member (gas pedal) for controlling the engine, said predetermined creeping speed being employed in said control system as a control value for controlling said clutch at a certain transmission ratio (gear) when said driver-operated control member is not actuated and the vehicle speed is below a predetermined threshold value, wherein said clutch is controlled in such that, with said predetermined minimum engine speed, movement of the vehicle at a predetermined creeping speed is obtained.

2. A control system according to claim 1, wherein at engine speeds above idle speed the clutch is engaged.

3. A control system according to claim 1, wherein at engine speeds higher than idle speed, the clutch is engaged while maintaining a vehicle speed greater then said predetermined low speed.

4. A control system according to claim 1, wherein during operation of the vehicle at creeping speeds the torque transmitted by the clutch remains below a predetermined threshold value.

* * * * *